US007797179B2

(12) United States Patent
Chakraborty et al.

(10) Patent No.: US 7,797,179 B2
(45) Date of Patent: Sep. 14, 2010

(54) METHOD AND APPARATUS FOR PLANNING MAJOR OUTAGES FOR GAS TURBINES

(75) Inventors: Amit Chakraborty, Cranbury, NJ (US); Andre Werner, Potsdam (DE); Venkatraman Gurumurthi, Berlin (DE); Ammaiappan Balasubramanian, Plainsboro, NJ (US); Robin Hoeher, Berlin (DE); Michael Rindler, Schoeneiche bei Berlin (DE); Michael Lange, Wiesbaden (DE)

(73) Assignees: Siemens Corporation, Iselin, NJ (US); Siemens Aktiengesellschaft, Munich (DE)

( * ) Notice: Subject to any disclaimer, the term of this patent is extended or adjusted under 35 U.S.C. 154(b) by 1030 days.

(21) Appl. No.: 11/237,436

(22) Filed: Sep. 28, 2005

(65) Prior Publication Data

US 2007/0093988 A1    Apr. 26, 2007

(51) Int. Cl.
G06F 9/44 (2006.01)
(52) U.S. Cl. .............................. 705/7; 705/30; 702/60; 702/182
(58) Field of Classification Search .................. None
See application file for complete search history.

(56) References Cited

U.S. PATENT DOCUMENTS

| | | | | |
|---|---|---|---|---|
| 4,801,421 A * | 1/1989 | Ackerson et al. | ............. | 376/249 |
| 4,965,743 A * | 10/1990 | Malin et al. | ................... | 706/45 |
| 5,331,579 A * | 7/1994 | Maguire et al. | ................ | 703/2 |
| 5,648,919 A * | 7/1997 | Yamauchi et al. | .............. | 703/6 |
| 6,226,597 B1 * | 5/2001 | Eastman et al. | .............. | 702/34 |
| 6,363,330 B1 * | 3/2002 | Alag et al. | ................. | 702/132 |
| 6,772,098 B1 * | 8/2004 | Stark et al. | .................. | 702/188 |
| 7,058,552 B2 * | 6/2006 | Stothert et al. | ................ | 703/2 |
| 7,088,255 B2 * | 8/2006 | Ridolfo et al. | .............. | 340/635 |
| 7,096,156 B2 * | 8/2006 | Hosaka et al. | .............. | 702/182 |
| 7,117,122 B2 * | 10/2006 | Zielinski et al. | ............. | 702/183 |
| 7,124,059 B2 * | 10/2006 | Wetzer et al. | ................ | 702/184 |
| 7,337,099 B2 * | 2/2008 | Kropaczek et al. | ............. | 703/6 |
| 7,337,183 B2 * | 2/2008 | Near | ................................. | 1/1 |
| 7,383,167 B2 * | 6/2008 | Oke | ........................... | 703/18 |

(Continued)

FOREIGN PATENT DOCUMENTS

EP    1 122 676 A    8/2001

(Continued)

OTHER PUBLICATIONS

Zhao, Yongjun (2005). An integrated framework for gas turbine based power plant operational modeling and optimization. Ph.D. dissertation, Georgia Institute of Technology, United States.*

(Continued)

Primary Examiner—Romain Jeanty
Assistant Examiner—Gurkanwaljit Singh (57) ABSTRACT

A system and method for planning outages for a power generation installation comprising a gas turbine power plant. The system and method utilizes a computer to receive requests from users to create maintenance plans for the power plant by generating templates, applying the templates to a database containing gas turbine data for the power generation installation; and receiving data from users to create maintenance package plans. Users can select either modular or turnkey maintenance plans. Modular maintenance package options enable a user to specifically select and obtain price quote information for parts and technicians who perform the maintenance tasks, and to specify particular shift options for the technicians.

18 Claims, 11 Drawing Sheets

U.S. PATENT DOCUMENTS

| | | | |
|---|---|---|---|
| 7,409,363 B2* | 8/2008 | Hosaka | 705/28 |
| 7,457,762 B2* | 11/2008 | Wetzer et al. | 705/8 |
| 7,457,763 B1* | 11/2008 | Garrow et al. | 705/8 |
| 7,458,028 B2* | 11/2008 | Chidambaram et al. | 715/736 |
| 7,461,008 B2* | 12/2008 | Garrow et al. | 705/8 |
| 7,475,122 B2* | 1/2009 | Azpitarte | 709/217 |
| 7,475,320 B2* | 1/2009 | Knebel et al. | 714/746 |
| 7,502,744 B2* | 3/2009 | Garrow et al. | 705/1.1 |
| 7,533,715 B1* | 5/2009 | Klahn et al. | 165/11.2 |
| 7,634,385 B2* | 12/2009 | Smith | 702/182 |
| 7,721,213 B2* | 5/2010 | Chidambaram et al. | 715/736 |
| 7,729,789 B2* | 6/2010 | Blevins et al. | 700/83 |
| 7,730,096 B2* | 6/2010 | Edwy et al. | 707/793 |
| 7,734,764 B2* | 6/2010 | Weiner et al. | 709/224 |
| 2002/0035495 A1* | 3/2002 | Spira et al. | 705/7 |
| 2002/0040431 A1* | 4/2002 | Kato et al. | 713/168 |
| 2002/0105546 A1* | 8/2002 | Kuntz | 345/762 |
| 2002/0120412 A1* | 8/2002 | Hayashi et al. | 702/61 |
| 2002/0123864 A1* | 9/2002 | Eryurek et al. | 702/188 |
| 2002/0173984 A1* | 11/2002 | Robertson et al. | 705/1 |
| 2002/0194225 A1* | 12/2002 | Karaila | 707/513 |
| 2003/0004659 A1* | 1/2003 | Hayashi et al. | 702/60 |
| 2003/0172002 A1* | 9/2003 | Spira et al. | 705/27 |
| 2003/0216994 A1* | 11/2003 | Peljto et al. | 705/37 |
| 2003/0220864 A1* | 11/2003 | Peljto et al. | 705/37 |
| 2003/0229576 A1* | 12/2003 | Peljto et al. | 705/37 |
| 2004/0015271 A1* | 1/2004 | Juneau | 700/291 |
| 2004/0054564 A1* | 3/2004 | Fonseca et al. | 705/7 |
| 2004/0102873 A1* | 5/2004 | Stark et al. | 700/286 |
| 2004/0111325 A1* | 6/2004 | Near | 705/26 |
| 2004/0131508 A1* | 7/2004 | Fairlie et al. | 422/112 |
| 2004/0181369 A1 | 9/2004 | Hayashi | |
| 2005/0015227 A1* | 1/2005 | Kropaczek et al. | 703/6 |
| 2005/0016175 A1* | 1/2005 | Barber et al. | 60/696 |
| 2005/0240909 A1* | 10/2005 | Tersigni | 717/140 |
| 2006/0200772 A1* | 9/2006 | Dhanapal et al. | 715/760 |
| 2006/0253311 A1* | 11/2006 | Yin et al. | 705/8 |

FOREIGN PATENT DOCUMENTS

| | | |
|---|---|---|
| WO | 01/57651 A1 | 8/2001 |
| WO | 01/67290 A | 9/2001 |

OTHER PUBLICATIONS

Dominion Resources Inc Annual Report—2002 ProQuest Annual Reports. 2002. p. 1.*

J Zhu, Z Tian, T Li, W Sun, & et al. (2004). Model-driven business process integration and management: A case study with the Bank SinoPac regional service platform. IBM Journal of Research and Development, 48(5/6), 649-669.*

F.T.S. Chan, H.C.W. Lau, & C.C. Ko. (2000). Outage planning of electrical power system networks using genetic algorithm. Journal of Quality in Maintenance Engineering, 6(4), 241-260.*

Turbine Fleet Management Launched to Serve Combustion Turbine Power Plants and Fleets PR Newswire. New York: Sep. 4, 2002. p. 1.*

Dusmanta Kumar Mohanta, Pradip Kumar Sadhu, and R. Chakrabarti "Fuzzy reliability evaluation of captive power plant maintenance scheduling incorporating uncertain forced outage rate and load representation" Electric Power Systems Research vol. 72, Issue 1, Nov. 15, 2004, pp. 73-84.*

Wade D. Cook and Rodney H. Green "Evaluating power plant efficiency: a hierarchical model" Computers & Operations Research, vol. 32, Issue 4, Apr. 2005, pp. 813-823.*

Yamayee, Z.A.; , "Maintenance Scheduling: Description, Literature Survey, and Interface with Overall Operations Scheduling," Power Apparatus and Systems, IEEE Transactions on , vol.PAS-101, No. 8, pp. 2770-2779, Aug. 1982.*

Yamayee, Z.; Sidenblad, K.; Yoshimura, M.; , "A Computationally Efficient Optimal Maintenance Scheduling Method," Power Apparatus and Systems, IEEE Transactions on , vol.PAS-102, No. 2, pp. 330-338, Feb. 1983.*

R. C. M. Yam, P.W. Tse, and P. Tu "Intelligent Predictive Decision Support System for Condition-Based Maintenance" The International Journal of Advanced Manufacturing Technology, vol. 17, No. 5 / Feb. 2001.*

"Troubleshooting Rotating Machinery Vibration Problems" McCloskey, Thomas H., Power Engineering. Barrington: Jul. 1990. vol. 94, Iss. 7; p. 30, 2 pgs.*

International Business Machines Corporation: "XML-EDI Application Architecture", Research Disclosure, Mason Publications, Hampshire, GB, vol. 450, No. 92, Oct. 2001.

SNEED, "Accessing Legacy Mainframe Applications Via the Internet", Internet Citation, Mar. 1, 2000, http://www.cs.ucr.edu/~stilley/wse2000/WSE2000.pdf>.

Badros, "The Extensible Templating Language: An XML-based Restricted Markup-Generating Language", Internet Citation, Nov. 2002, http://www.badros.com/greg/papers/etl-www2003.pdf>.

* cited by examiner

☑ Turning Gear to Turning Gear Service

[Previous Page] [Plan Now]

Reference Documents for TK1

| Description | File Format |
|---|---|
| TK1 User Manual Modular Planning Process Type V94.2 | 🔷 |
| TK1 Commercial Condition and International Conditions for Supplies and Services | 🔷 |
| TK1 Service Event Type V94.2 | 🔷 |
| TK1 Turnkey Outage Speed Initiative Type V94.2 | ◇ |
| TK1 Turnkey Standard Type V94.2 | ◇ |
| Levels of Responsibility (Technical) for Field Service Activities in the W Region | 🔷 |
| Field Service Solutions | 🔷 |

500

Done — Local Intranet

METHOD AND APPARATUS FOR PLANNING MAJOR OUTAGES FOR GAS TURBINES

BACKGROUND OF THE INVENTION

The present invention relates generally to a system and method for planning major outages for power generation systems, and more particularly, to an apparatus and methodology for creating highly configurable outage plans for gas turbines.

Servicing power plants is a very important and lucrative business for turbine manufacturers. Since both downtime as well as damage can be very expensive, it is necessary to plan outages for them in a timely manner and assure that all the infrastructure and the resources necessary are available "just-in-time". Otherwise outages cannot be serviced properly and are likely to lead to cost overruns. However, this is a very complex process; there are many different types of turbines in service, and over a typical lifespan of 30 years or more, each turbine assembly will undergo a variety of modifications and changes to thereby become unique. Furthermore, turbine outages require a plurality of resources, both human and material.

Gas turbine operation is characterized by the use of atmospheric air as the working fluid and the direct injection of fuel into the compressed air. Gas turbine engines typically include a core engine with a compressor for compressing air entering the core engine, a combustor where fuel is mixed with the compressed air and then burned to create a high energy gas stream, and a first turbine which extracts energy from the gas stream to drive the compressor. The energy generated by the turbine is extracted for power generation. The rotating engine components of the turbine and compressor include a number of blades attached to a disc which are surrounded by a stationary shroud. The gas turbine components operate in a very high temperature environment and under a variety of loading conditions. Deterioration of parts due to thermal fatigue and wear is a real concern. Maintenance is performed to detect and control wear, as well as to repair or replace wear parts as needed to restore wear reserves. With proper maintenance, gas turbines can be operated with high reliability and availability despite the aforementioned characteristics. It is imperative that these maintenance services are performed quickly, and in a planned manner to make sure that the plants do not have any unscheduled downtime. An unplanned outage caused by a turbine failure can cause significant economic losses for the power generating authority.

Planning outages is a very complicated process. Gas turbines normally have a very long life and during each outage they undergo a certain amount of modification that makes them structurally unique. Also, each outage needs a significant amount of infrastructure availability and resources. The local infrastructure could either be available, rented or imported. In the same way the necessary parts could either be available in the facility warehouse or might have to be shipped in from the maintenance vendor's site. The same can be said of the required human resources. While some experts might be locally available, others may be required to travel relatively large distances to accomplish a given maintenance task. At the same time, certain work may easily be contracted out to local vendors. Hence, not only are a significant number of resources necessary, but there may be a myriad of options available with regard to resource planning. The cost of the final plan will be dependent on the mode and the actual configuration that are decided for each one of these resources.

In this field, U.S. Pat. No. 6,907,381 to Hayashi et al. ("Hayashi") discloses a system for aiding in the preparation of an operation and maintenance plan for a power generation installation in which an operation plan for a plurality of power generation units is prepared by employing actual plant data and a variety of circumstances concerning the machines and parts thereof in the power generation units. For each power generation unit, a service center calculates power generation efficiency in real time by utilizing obtained plant and design data, and prepares operation and maintenance plans based on the calculated power efficiency. In accordance with an aspect of the system, an exchange timing of the apparatus and constituent parts is performed with reference to accumulated operating time, or calculated cost of economic loss and cost relating to exchange of the machine based on measured plant data.

SUMMARY OF INVENTION

In accordance with an aspect of the present invention, there is provided a system and methodology for planning outages for a power generation installation comprising a power generation unit such as a gas turbine.

In accordance with a first aspect of the invention, a method for planning outages for a power generation installation is provided. The method generally comprises the steps of: receiving at a server a request from a user at a user terminal to create a maintenance plan for a power plant in the power generation installation; generating a template; applying the template to a database containing power plant data for the power generation installation; and receiving data from the user to create a maintenance package plan. The data received from the user may relate to specifics such as turbine type, shift mode and event type. The shift mode that may be specified relates to the number of shifts per day for maintenance personnel. The event type may be defined as a major inspection, minor inspection, hot gas inspection and the like.

In accordance with another aspect of the invention; a system for planning outages for a power generation installation is provided. The system includes a server comprising a machine readable medium containing executable program instructions which, when executed by a processor, direct the server to: receive a request from a user to create a maintenance plan for a power plant in the power generation installation; generate a template; apply the template to a database containing power plant data for the power generation installation; and receive data from the user to create a maintenance package plan.

These and other advantages of the invention will be apparent to those of ordinary skill in the art by reference to the following detailed description and the accompanying drawings.

DETAILED DESCRIPTION OF THE PREFERRED EMBODIMENTS

Embodiments of the invention will be described with reference to the accompanying drawing figures wherein like numbers represent like elements throughout. Before embodiments of the invention are explained in detail, it is to be understood that the invention is not limited in its application to the details of the examples set forth in the following description or illustrated in the figures. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

It should be noted that the invention is not limited to any particular software language described or implied in the figures. One of ordinary skill in the art will understand that a variety of alternative software languages may be used for implementation of the invention. It should also be understood that some components and items are illustrated and described as if they were hardware elements, as is common practice within the art. However, one of ordinary skill in the art, and based on a reading of the detailed description, would understand that in at least one embodiment, components in the method and system may be implemented in software or hardware.

Embodiments of the invention provide methods, systems, and a computer-usable medium storing computer-readable instructions for providing template data validation using logic constraint specifications. The invention is a modular framework and is deployed as software as an application program tangibly embodied on a program storage device. The application code for execution can reside on a plurality of different types of computer readable media known to those skilled in the art.

In one embodiment, the invention is deployed as a network-enabled framework and is accessed through a graphical user interface (GUI). The application resides on a server and is accessed via a browser such as Mozilla Firefox, Microsoft IE (Internet Explorer), or others, over a network or the Internet using Internet standards and scripting languages including HTML, dynamic HTML (DHTML), Microsoft VBScript (Visual Basic Scripting Edition), Jscript, ActiveX and Java. A user contacts a server hosting the application and requests information or resources. The server locates, and then sends the information to the browser which displays the results.

Figure 1:
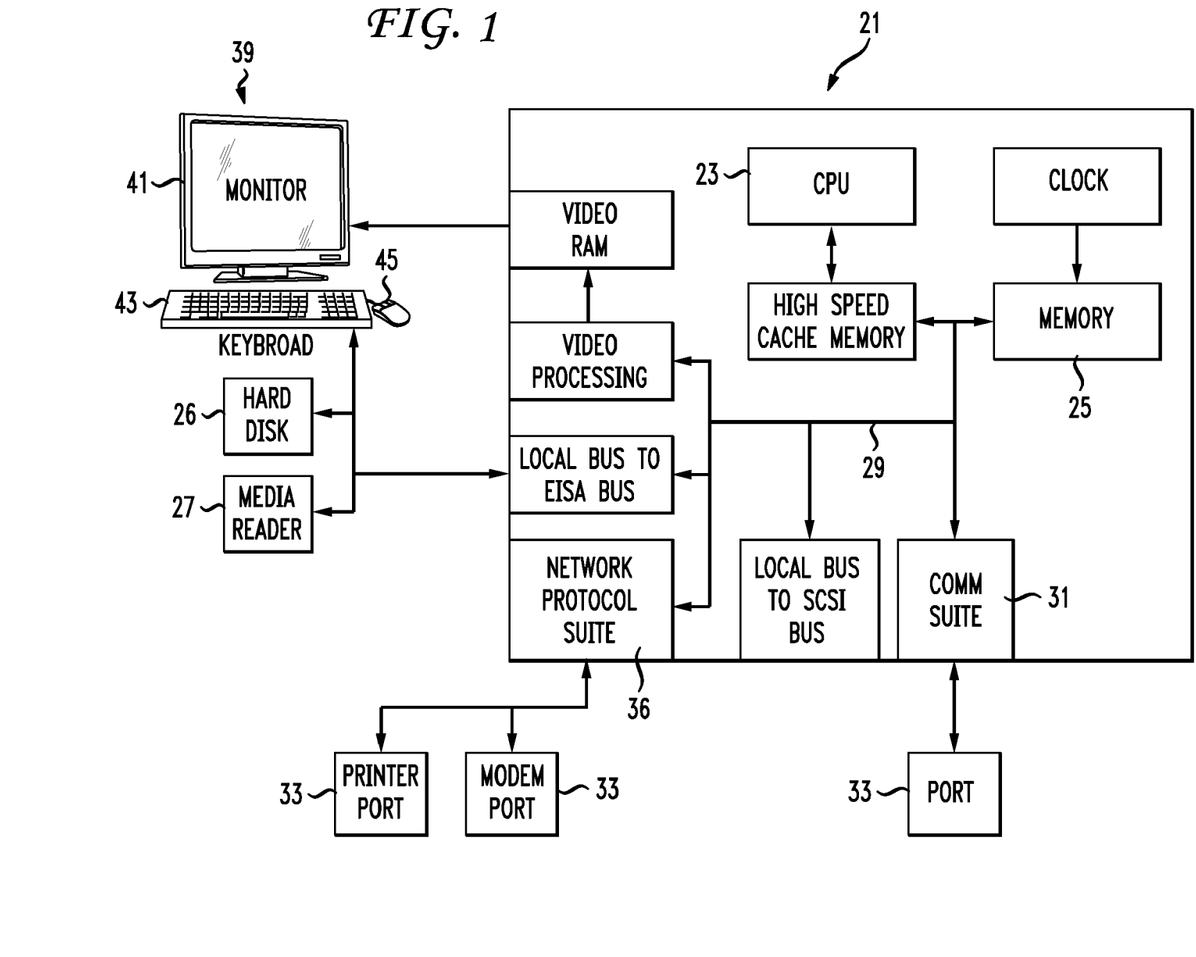
FIG. 1 is a schematic of an exemplary client computer on which a system for carrying out an aspect of the invention may be deployed.

An embodiment of a computer 21 executing the instructions of an embodiment of the invention is shown in FIG. 1. A representative hardware environment is depicted which illustrates a typical hardware configuration of a computer. The computer 21 includes a CPU 23, memory 25, a reader 27 for reading computer executable instructions on computer readable media, a common communication bus 29, a communication suite 31 with external ports 33, a network protocol suite 35 with external ports 37 and a GUI 39.

The communication bus 29 allows bi-directional communication between the components of the computer 21. The communication suite 31 and external ports 33 allow bi-directional communication between the computer 21, other computers 21, and external compatible devices such as laptop computers and the like using communication protocols such as IEEE 1394 (FireWire or i.LINK), IEEE 802.3 (Ethernet), RS (Recommended Standard) 232, 422, 423, USB (Universal Serial Bus) and others.

The network protocol suite 35 and external ports 37 allow for the physical network connection and collection of protocols when communicating over a network. Protocols such as TCP/IP (Transmission Control Protocol/Internet Protocol) suite, IPX/SPX (Internetwork Packet eXchange/Sequential Packet eXchange), SNA (Systems Network Architecture), and others. The TCP/IP suite includes IP (Internet Protocol), TCP (Transmission Control Protocol), ARP (Address Resolution Protocol), and HTTP (Hypertext Transfer Protocol). Each protocol within a network protocol suite has a specific function to support communication between computers coupled to a network. The GUI 39 includes a graphics display such as a CRT, fixed-pixel display or others 41, a key pad, keyboard or touchscreen 43 and pointing device 45 such as a mouse, trackball, optical pen or others to provide an easy-to-use, user interface for the invention.

The computer 21 can be a handheld device such as an Internet appliance, PDA (Personal Digital Assistant), tablet PC, Blackberry device or conventional personal computer such as a PC, Macintosh, or UNIX based workstation running their appropriate OS (Operating System) capable of communicating with a computer over wireline (guided) or wireless (unguided) communications media. The CPU 23 executes compatible instructions or software stored in the memory 25. Those skilled in the art will appreciate that the invention may also be practiced on platforms and operating systems other than those mentioned.

A communications network can be a single network or a combination of communications networks including any wireline, wireless, broadband, switched, packet or other type of network through which voice or data communications may be accomplished. Networks allow more than one user to work together and share resources with one another. Aside from distributed processing, a network provides centralized storage capability, security and access to resources.

Network architectures vary for LANs (Local Area Networks) and WANs (Wide Area Networks). Some examples of LAN network architectures include Ethernet, token ring, FDDI (Fiber Distributed Data Interface) and ATM (Asynchronous Transfer Mode). The capability of individual computers being linked together as a network is familiar to one skilled in the art.

Figure 2:
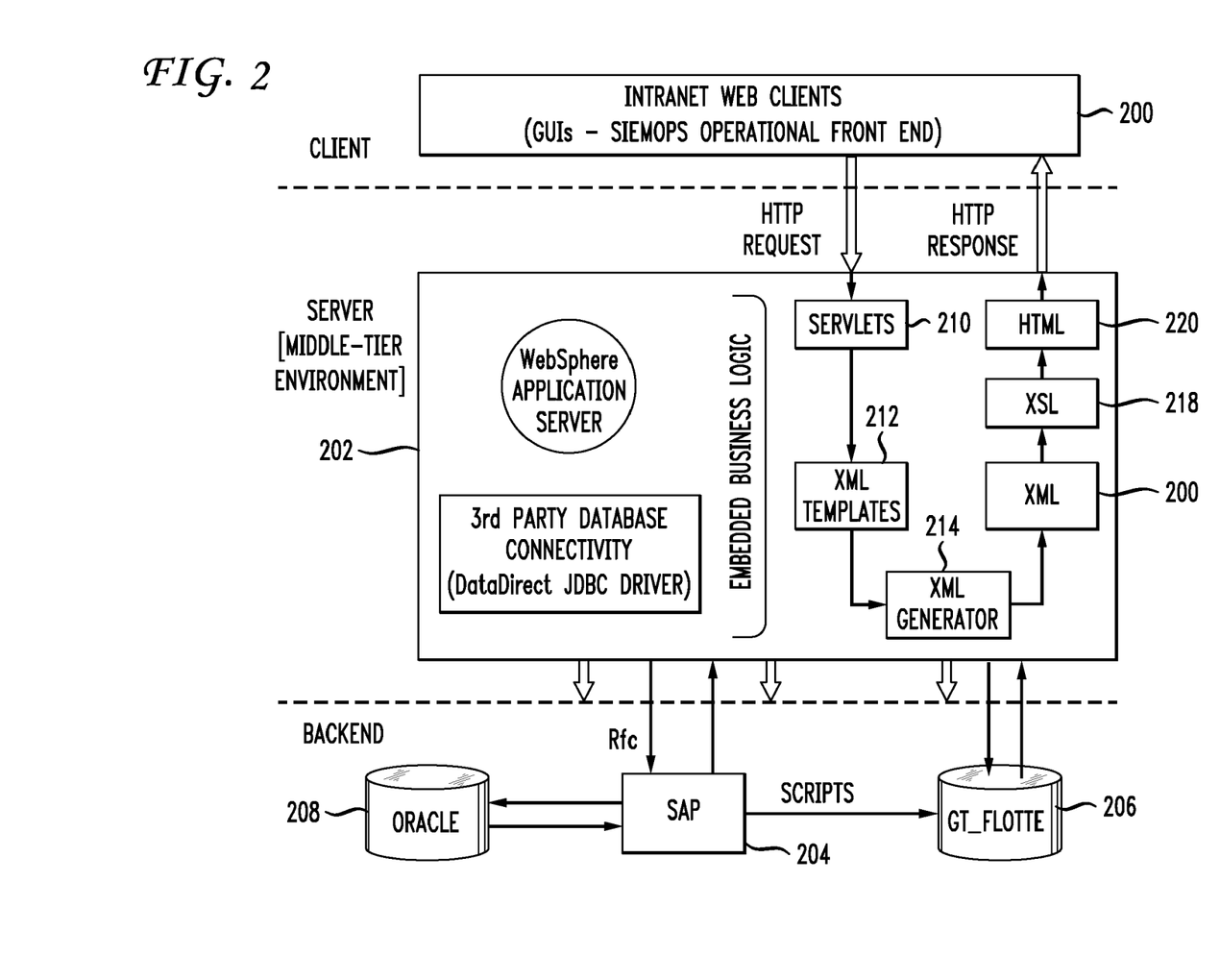
FIG. 2 is a schematic of an overall system architecture for carrying out an aspect of the invention.

FIG. 2 depicts an overall system architecture for carrying out an aspect of the invention. A user computer 200 communicates over a network with a server 202. The server 202 communicates over an appropriate interface with a "backend" comprising an enterprise resource planning system (SAP) 204 and a GT_Flotte database 206. The functions of these components will be described in more detail hereinbelow. The SAP 204 communicates with an Oracle database 208, the function of which will also be described in more detail below. The user computer 202 includes different forms that need to be filled up to create different plan components. The server 202 achieves configurability by generating user specific forms that are customized based on the location of a site, the role of the user, and the actual unit undergoing maintenance planning. The server 202 receives HTML requests from the user computer 200 and runs servlets at block 210. The servlets 210 then communicate with block 212 to create or access reusable XML templates. These templates contain rules for maintenance planning. An XML generator 214 generates output XML documents 216 based upon the specification in the templates. The XML documents 216 are converted to XSL at block 218 and then to HTML at block 220. XSL gives a developer the tools to describe exactly which data fields in an XML file to display and exactly where and how to display them. The HTML page is communicated in an HTML response back to the user computer 200 in a conventional manner as is well known in the art.

The GT_Flotte database 206 maintains "fleet data" such as data that represents equipment manufactured by a particular manufacturer (i.e., a turbine manufactured by Siemens AG), customer information, location information, time in service, time between overhaul, periodic inspections, failure information, remaining life information, and the like. The GT_Flotte database is commercially available from Siemens AG.

The SAP 204 is an enterprise resource planning system that maintains inventory and pricing for component parts for the turbine units. SAP applications provide the capability to manage financial, asset, and cost accounting, production operations and materials, personnel, plants and archived documents. For example, if a particular compressor or turbine part needs replacement, the SAP will 204 will provide inventory and pricing information for that part.

The Oracle database 208 communicates with the SAP 204 to provide other relevant information to the system, such as ongoing maintenance service history. The Oracle database 208 may be employed to track, for example, how many hours are on a particular part in the system.

The on-line planning system in accordance with an aspect of the invention employs a content generator module with a graphical user interface (GUI) that allows a user configure a maintenance plan for a particular machine unit or turbine. The maintenance plan is comprised of several parts, each one of which is dependent upon the user and the selections that he or she makes to optimize the plan as required. The content generator operates on the principle that a template is applied to the data in the GT_Flotte database 206 and the SAP 204. The database 206 retrieves the information and the generated output is in the form of XML files that conform to a certain structure. The template is written in XML and contains instructions on how to map the plan data in the database 206 to the form fields shown to the user on the computer 200. The template specifies static and dynamic parameters used to query the source database 206. It also has branching and looping logic to represent the resource constraints in the configuration process. This will be better understood with reference to FIG. 3, which depicts a flow diagram for content generation.

Figure 3:
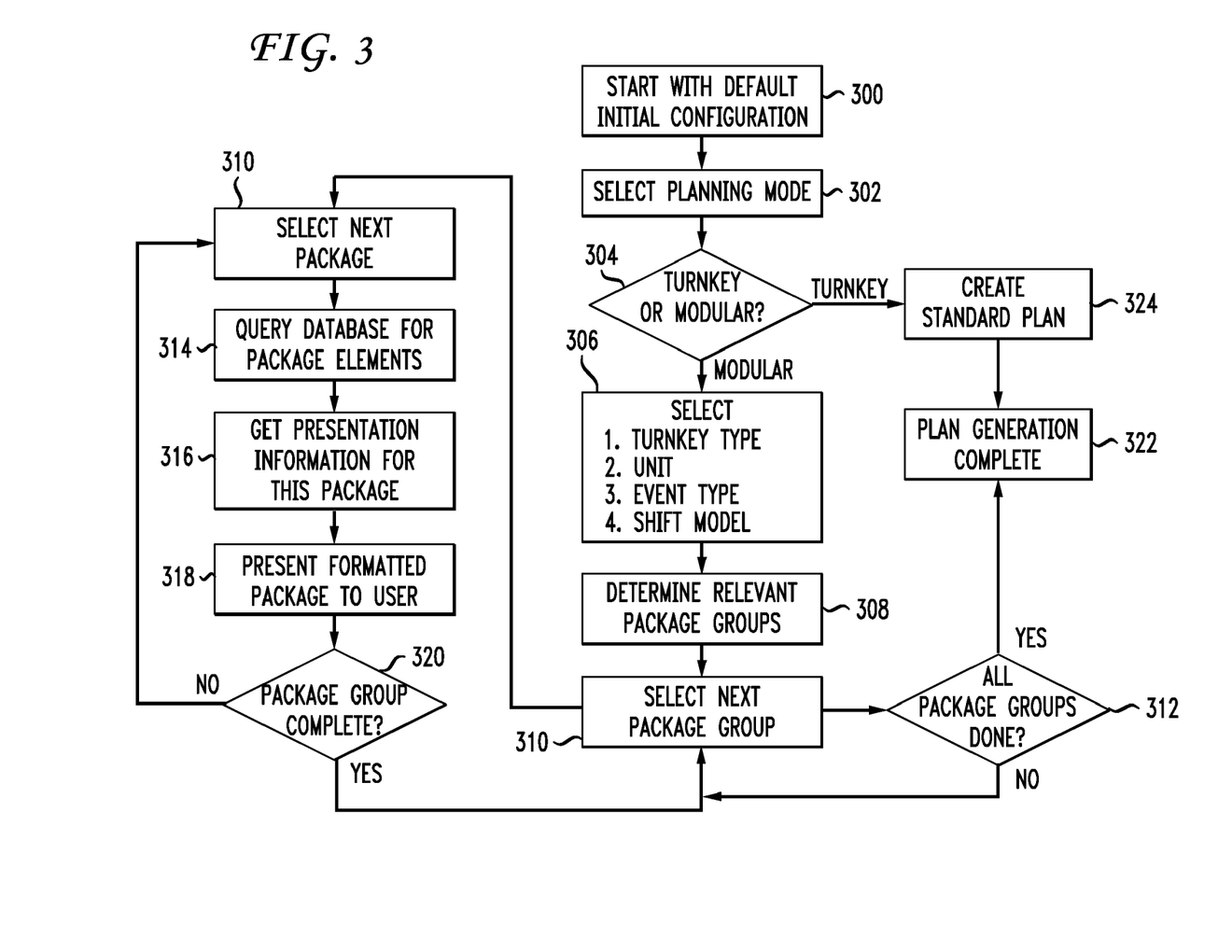
FIG. 3 is a flow diagram of content generation for maintenance planning.

In FIG. 3, at step 300 the user computer 200 presents a default initial configuration via the graphical user interface (GUI). The default initial configuration is based on the site and user privileges. At step 302, the GUI enables the user to select the type of planning mode. At step 304 an option is presented for the user to either select a "turnkey" planning mode or a "modular" planning mode. A turnkey planning mode may be defined as a standard prescribed mode that is established by planning engineers. For example, the overhaul may be accomplished at a "normal speed" during regular operating hours, or an outage speed approach may be employed if the customer requires a faster turnaround. If the modular planning mode is selected at 304, then at step 306 the user can select from prescribed options such as turbine type, unit, event type, outage (i.e., major inspection, minor inspection, hot gas inspection, etc.) and shift model (i.e., whether the work will be completed in one or two shifts per day and the duration of each shift). This selection determines the package groups that define the complete maintenance plan. The relevant package groups are defined at step 308. The user continues to select package groups at step 310 until all package groups are completed at step 312. For each package group selected, template elements are queried from the databases 206 and 208 at step 314. Relevant data is retrieved from the databases 206, 208 to fill up the template to create the appropriate package. At step 316, the system obtains stored presentation information and applies this information to the template. At step 318, the formatted package is presented to the user via the GUI. The user is then able to make the appropriate selections and enter the relevant data to complete the package. If the package group is complete at step 320, the user can select the next package group at 310 if there are packages remaining. The plan content is comprised of a compilation of all packages in all package groups. If all package groups are completed at step 312, then plan generation is deemed complete at step 322. If the user has selected the turnkey option at step 304, a standard plan is created at block 324. The standard plan is created by using default options stored in database 206 (see FIG. 2).

Figure 4:
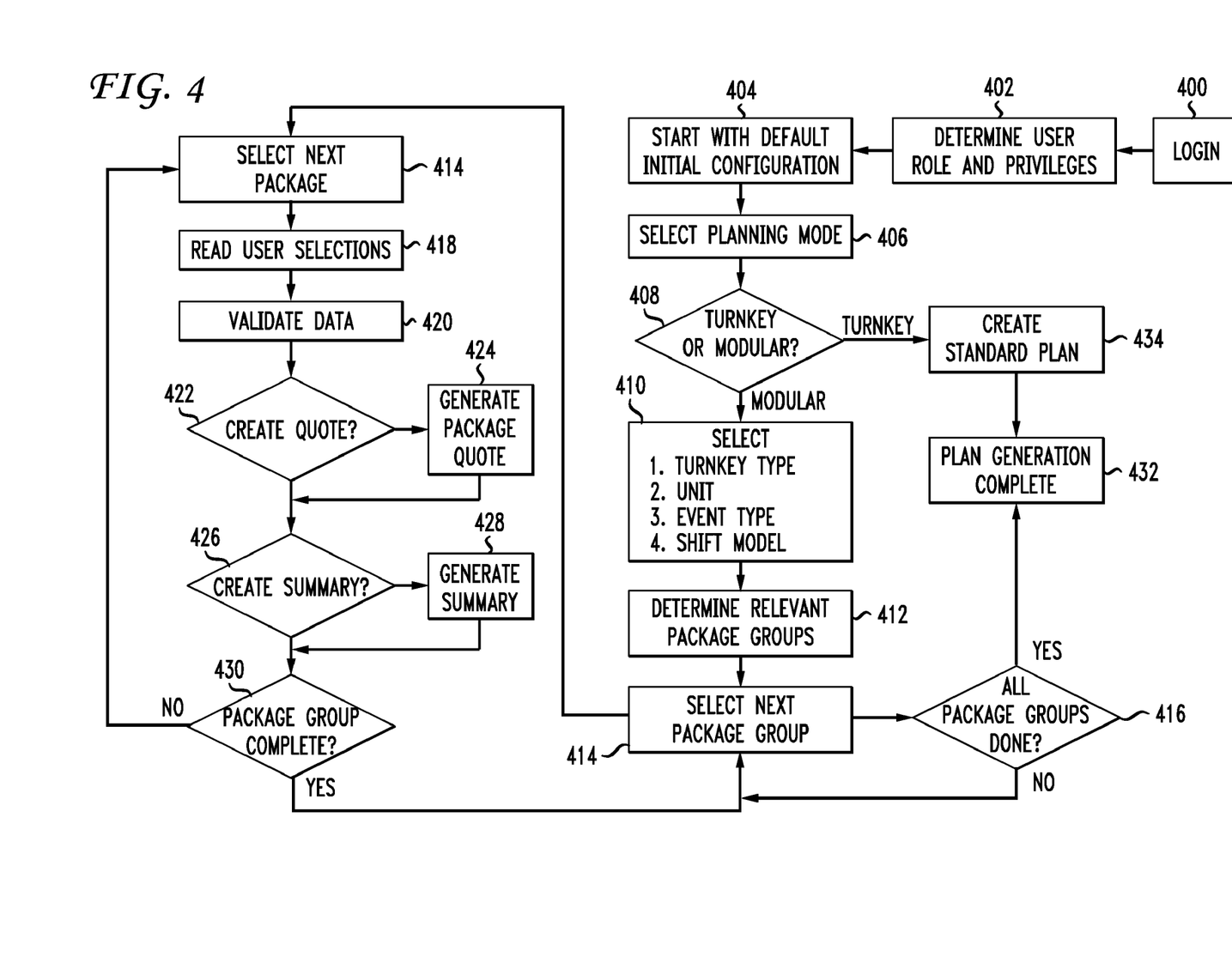
FIG. 4 is a flow diagram of planning and navigation framework in accordance with an aspect of the invention.

Referring now to FIG. 4, there is depicted a planning and navigation flow diagram in accordance with an aspect of the invention. In step 400, the user logs on to the system in a conventional manner. At step 402, the user role and privileges are determined. At step 404, the GUI presents an initial default configuration to the user. The system can determine from the user profile for which machines and systems the user is permitted to view or create plans. At step 406 the user is provided with the type of planning mode (either "turnkey" or "modular") as described in the foregoing. The planning mode option is selected at step 408. If the user selects a modular plan at 308, then at 410 the user can select from prescribed options such as turbine type, unit, event type, outage (i.e., major inspection, minor inspection, hot gas inspection, etc.) and shift model (i.e., whether the work will be completed in one or two shifts per day and the duration of each shift). This selection determines the package groups that define the complete maintenance plan. The relevant package groups are defined at step 412. The user continues to select package groups at step 414 until all package groups are completed at step 416. The packages are grouped as field service packages, parts packages, repair, modification, refurbishment and the like. For each package, the user is required to enter several data elements via the GUI. For example, in connection with a work tools package, the user enters data for each tool that indicates, for example, whether the user wants to purchase or rent the tool. For technicians, the user selects whether the required expertise is locally available, or if special personnel need to be flown in for the job. The user selections are implemented at step 418. The data is then validated by the system at step 420. At step 422, the user is presented with an option of whether to create a quote for the package. If the answer is in the affirmative, a package quote is generated at step 424. At step 426, the user is presented with an option of whether to create a package summary. If the answer is in the affirmative, a summary is generated at step 428. If the package group is complete at step 430, then control jumps to step 416. If the package group is not complete, control jumps to step 414 and the user can select the next package group. The plan content is comprised of a compilation of all packages in all package groups. If all package groups are completed at step 416, then plan generation is completed at step 432. If the user has selected the turnkey option at step 408, a standard plan is created at step 424 utilizing the default options stored in database 206 (see FIG. 2).

Figure 5:
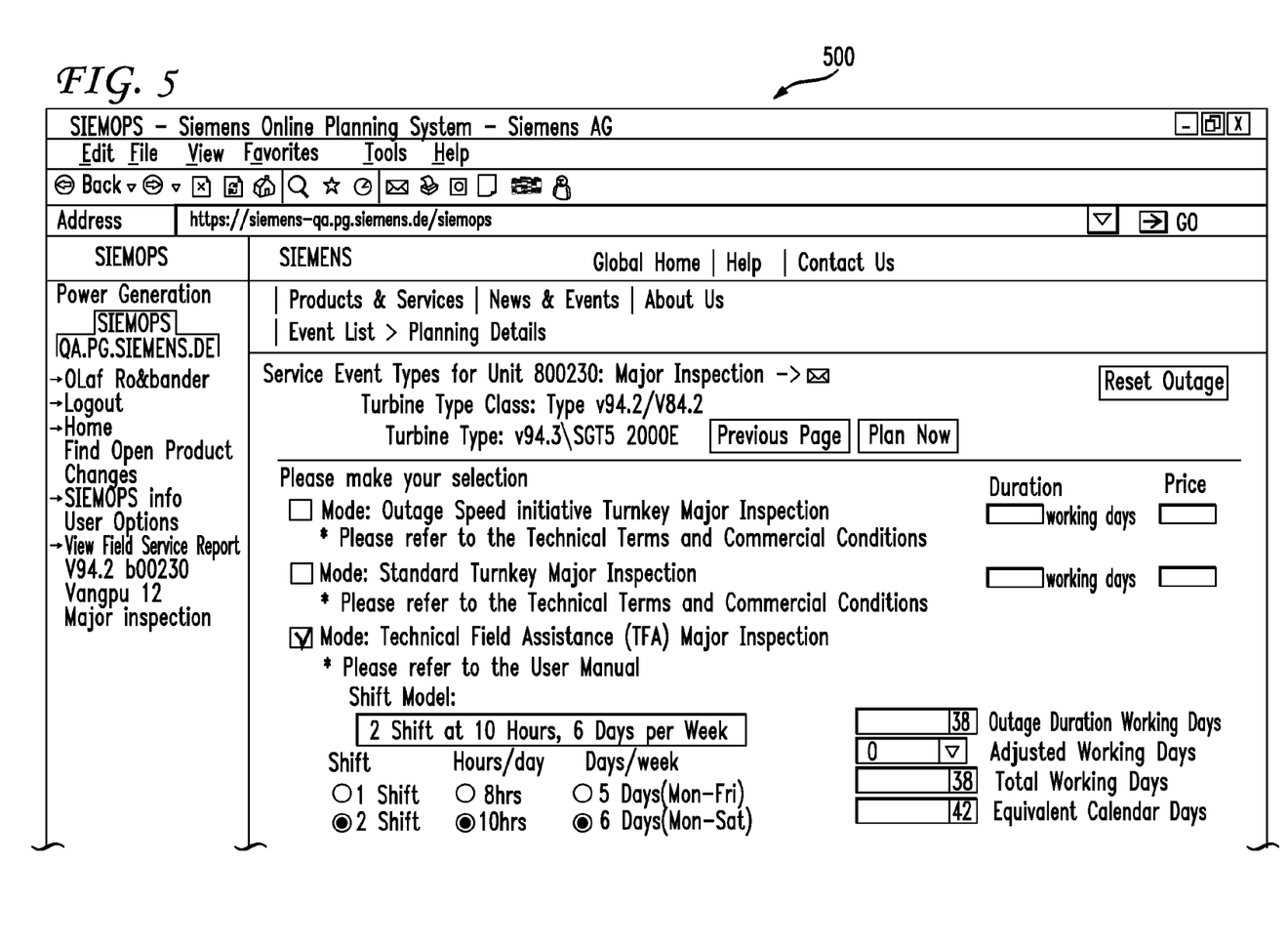
FIG. 5 is a screen shot of an exemplary GUI for implementing a major inspection.

FIG. 5 depicts an illustrative GUI 500 for implementing a major inspection.

Figure 6:
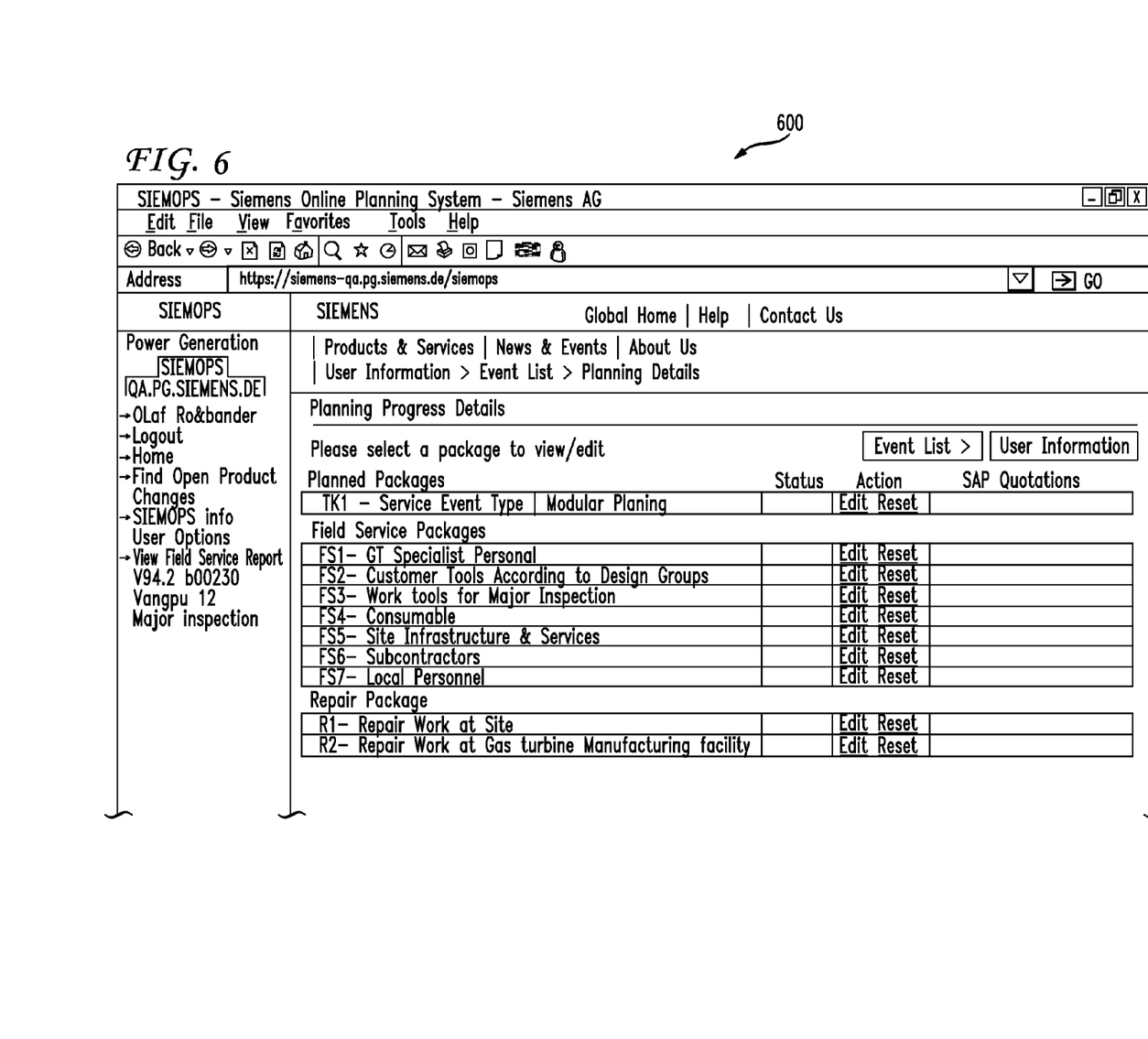
FIG. 6 is a screen shot of an exemplary GUI showing planning progress details and a plurality of packages for selection.

FIG. 6 depicts an illustrative GUI 600 for planning progress details and for enabling selection of a plurality of packages.

Figure 7:
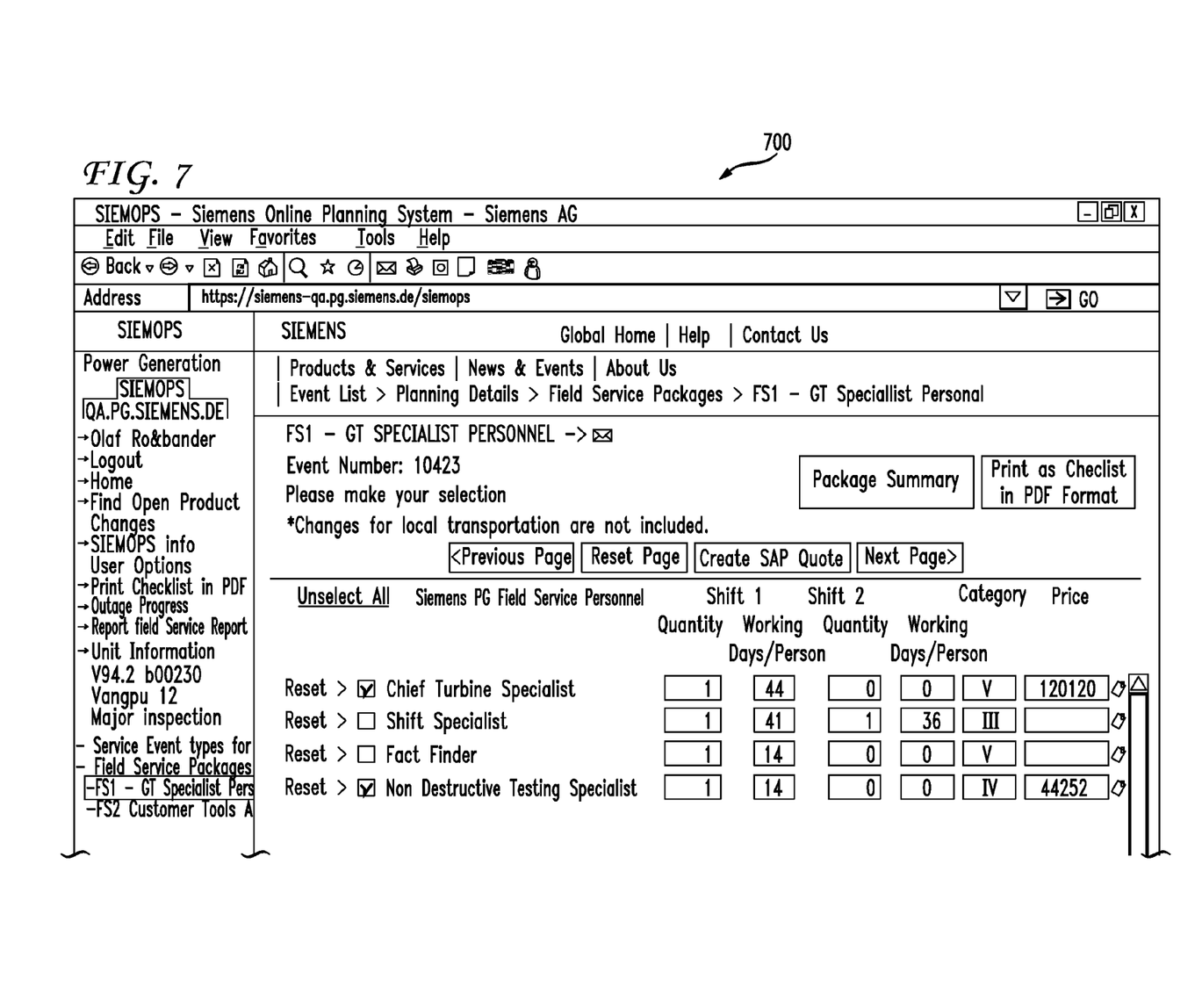
FIG. 7 is a screen shot of an exemplary GUI for selecting specialist personnel.

FIG. 7 depicts an illustrative GUI 700 for selecting specialist personnel.

Figure 8:
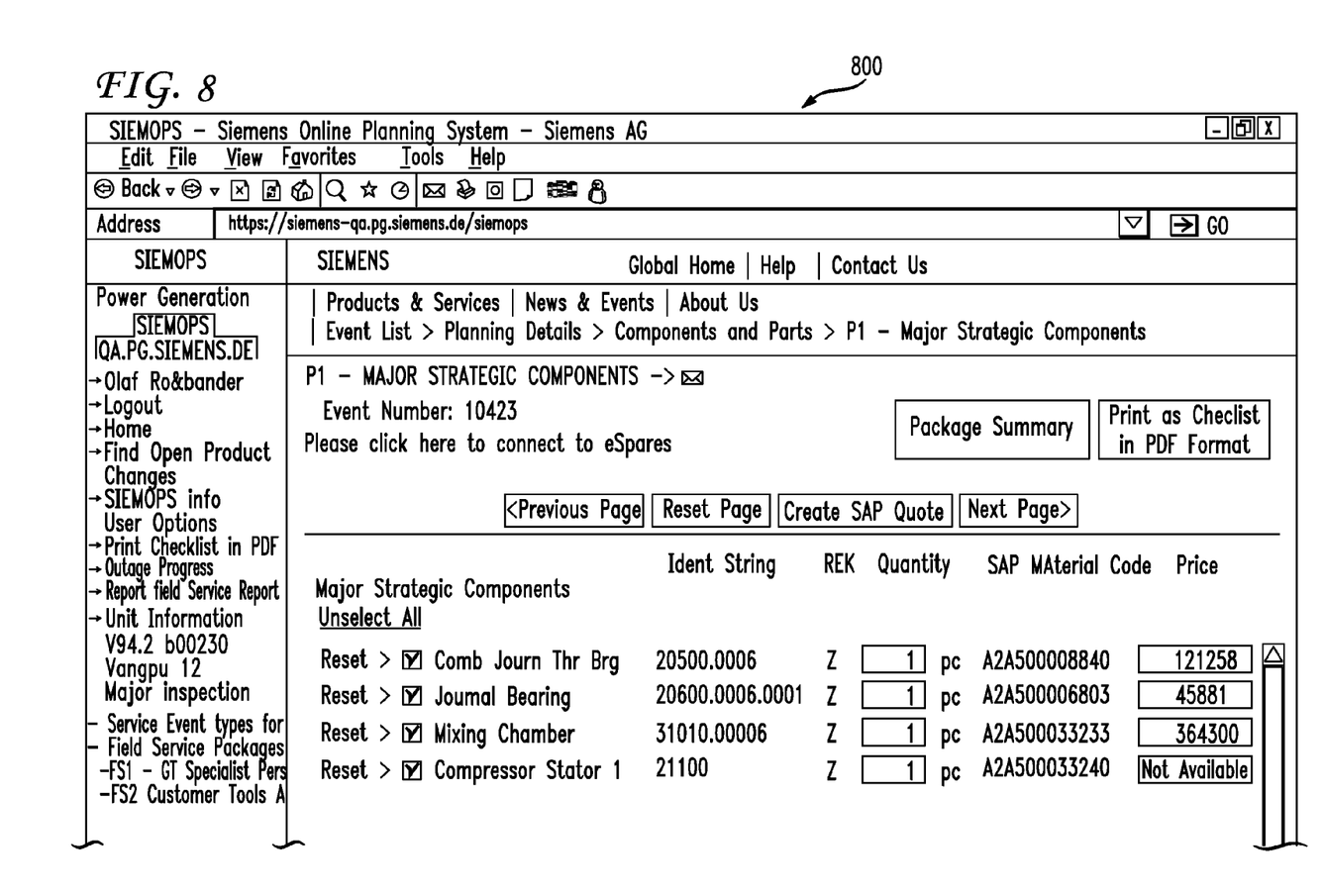
FIG. 8 is a screen shot of an exemplary GUI for selecting turbine components.

FIG. 8 depicts an exemplary GUI 800 for selecting turbine components.

Aspects of the present invention utilize an extensible architecture to configure maintenance plans based on unit locations and specifications, as well as particular customer requirements. Changes in the plan may be implemented by changing the user selections in the templates, thereby providing a system which is highly adaptive to user needs. XML templates enable a step-by-step procedure to be employed for generating packages that constitute the maintenance plan. Users can choose to select custom plans or create modular plans by selecting particular maintenance parameters and items that constitute the plan.

The present invention has been shown and described in what are considered to be the most practical and preferred embodiments. It is anticipated, however, that departures may be made therefrom and that obvious modifications will be implemented by those skilled in the art. It will be appreciated that those skilled in the art will be able to devise numerous arrangements and variations which, although not explicitly shown or described herein, embody the principles of the invention and are within their spirit and scope.

We claim:

1. A method for preparing a resource and cost plan for servicing a turbine component of a power generation installation, comprising the steps of:
   receiving a request from a user to create the resource and cost plan for performing a particular servicing task on the turbine component in the power generation installation;
   applying by a computer an Extensible Markup Language (XML) template to a at least one database containing resource and cost data for the turbine component in the power generation installation, the template containing:
      parameters for querying the at least one database for package elements of at least one package relevant to the turbine component, the package elements comprising fleet data representing the turbine component including maintenance history data of the turbine component, the package elements further comprising inventory and pricing for replacement parts required for servicing the turbine component;
      presentation instructions for presenting the at least one package to the user; and
      branching and looping logic for representing resource constraints to the user including branching based on a selection of a turbine service event type including prescribed options for selecting a major inspection, a minor inspection and a hot gas inspection, and for receiving entries from the user for modifying the at least one package relevant to the turbine component;
   presenting to the user a graphical user interface (GUI) generated by the applying of the template to the database, the GUI being based on the branching and looping logic and permitting the user to provide data to create the resource and cost plan for servicing the turbine component by following branches and loops of the logic; and
   receiving data from the user to create the resource and cost plan for servicing the turbine component, the received data being selected from the group consisting of turbine type, shift mode and event type.

2. The method recited in claim 1, wherein the shift mode relates to the number of shifts per day for maintenance personnel.

3. The method recited in claim 1, wherein the event type is selected from the group consisting of a major inspection, minor inspection and hot gas inspection.

4. The method recited in claim 1, wherein the at least one package is selected from the group consisting of a field service package, parts package, repair package, modification package and refurbishment package.

5. The method recited in claim 1, further comprising the step of generating a quote for the resource and cost plan.

6. The method recited in claim 1, further comprising the step of generating a quote for a constituent package that forms part of the resource and cost plan.

7. The method recited in claim 1, further comprising the step of generating an output of the data in the database in the form of XML files.

8. The method recited in claim 7, further comprising the steps of converting the XML files to HTML pages and sending the HTML pages to the user over a communications network.

9. The method recited in claim 1, further comprising the step of communicating with an enterprise resource planning system.

10. A system for preparing a resource and cost plan for servicing a turbine component of a power generation installation, the system including a nontransitory machine readable medium containing executable program instructions which, when executed by a processor, direct a computer to:
   receive a request from a user to create the resource and cost plan for performing a particular servicing task on the turbine component in the power generation installation;
   apply an Extensible Markup Language (XML) template to a at least one database containing resource and cost data for the turbine component power plant in the power generation installation, the template containing:
      parameters for querying the at least one database for package elements of at least one package relevant to the turbine component, the package elements comprising fleet data representing the turbine component including maintenance history data of the turbine component, the package elements further comprising inventory and pricing for replacement parts required for servicing the turbine component;
      presentation instructions for presenting the at least one package to the user; and
      branching and looping logic for representing resource constraints to the user including branching based on a selection of a turbine service event type including prescribed options for selecting a major inspection, a minor inspection and a hot gas inspection, and for receiving entries from the user for modifying the at least one package relevant to the turbine component;
   present to the user a graphical user interface (GUI) generated by the applying of the template to the database, the GUI being based on the branching and looping logic and permitting the user to provide data to create the resource and cost plan for servicing the turbine component by following branches and loops of the logic; and
   receive data from the user to create the resource and cost plan for servicing the turbine component, the received data being selected from the group consisting of turbine type, shift mode and event type.

11. The system recited in claim 10, wherein the shift mode relates to the number of shifts per day for maintenance personnel.

12. The system recited in claim 10, wherein the event type is selected from the group consisting of a major inspection, minor inspection and hot gas inspection.

13. The system recited in claim 10, wherein the at least one package is selected from the group consisting of a field service package, parts package, repair package, modification package and refurbishment package.

14. The system recited in claim 10, wherein the executable program instructions, when executed by the processor, further direct the computer to generate a quote for the resource and cost plan.

15. The system recited in claim 10, wherein the executable program instructions, when executed by the processor, further direct the computer to generating a quote for a constituent package that forms part of the resource and cost plan.

16. The system recited in claim 10, wherein the executable program instructions, when executed by the processor, further direct the computer to generate an output of the data in the database in the form of XML files.

17. The system recited in claim 10, wherein the executable program instructions, when executed by the processor, further direct the computer to convert the XML files to HTML pages and send the HTML pages to the user over a communications network.

18. The system recited in claim 10, comprising an enterprise resource planning system communicating with the computer.

* * * * *